US012692742B2

(12) United States Patent
Choi et al.

(10) Patent No.: US 12,692,742 B2
(45) Date of Patent: Jul. 28, 2026

(54) VEHICLE SIDE-BY-SIDE DOORS OPENING AND CLOSING SYSTEM AND CONTROL METHOD THEREOF

(71) Applicants: Hyundai Motor Company, Seoul (KR); Kia Corporation, Seoul (KR)

(72) Inventors: Hak-Hui Choi, Hwaseong-si (KR); Ki-Hyun Choi, Hwaseong-si (KR); Sang-Heon Lee, Hwaseong-si (KR); Hyung-Sik Choi, Hwaseong-si (KR); Doo Young Jung, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 18/795,718

(22) Filed: Aug. 6, 2024

(65) Prior Publication Data

US 2025/0270868 A1 Aug. 28, 2025

(30) Foreign Application Priority Data

Feb. 23, 2024 (KR) ........................ 10-2024-0026210

(51) Int. Cl.
*E05F 15/73* (2015.01)
*E05F 15/79* (2015.01)

(52) U.S. Cl.
CPC .............. *E05F 15/73* (2015.01); *E05F 15/79* (2015.01); *E05Y 2400/36* (2013.01); *E05Y 2400/415* (2013.01); *E05Y 2400/44* (2013.01); *E05Y 2400/54* (2013.01); *E05Y 2900/531* (2013.01)

(58) Field of Classification Search
CPC ...... E05F 15/73; E05F 15/79; E05Y 2400/36; E05Y 2400/415; E05Y 2400/44; E05Y 2400/54; E05Y 2900/531
USPC ........................................................... 701/49
See application file for complete search history.

(56) References Cited

U.S. PATENT DOCUMENTS 11,624,228 B1 * 4/2023 Austria .................. E05F 15/43 340/5.72
11,634,939 B2 * 4/2023 Battlogg ............... B60Q 1/324 701/49
12,215,531 B1 * 2/2025 Cheringal ........ G01R 19/16571
2006/0208678 A1 * 9/2006 Choby .................... E05F 15/41 318/280
2011/0295469 A1 * 12/2011 Rafii ....................... E05F 15/43 701/49
2022/0205300 A1 * 6/2022 Masuzawa ............ E05F 15/695
2022/0389746 A1 * 12/2022 Nishi ....................... B60J 5/062
(Continued)

FOREIGN PATENT DOCUMENTS

KR 19970035351 A 7/1997

*Primary Examiner* — Krishnan Ramesh
(74) *Attorney, Agent, or Firm* — Slater Matsil, LLP

(57) ABSTRACT

An embodiment vehicle side-by-side doors opening and closing system includes a pair of side-by-side doors having a first door and a second door configured to open outwardly from a vehicle toward a boarding and alighting structure and a controller configured to assign the first door and the second door to an initially operative door and a subsequently operative door and to control a first door motor of the first door and a second door motor of the second door to perform opening operations of the initially operative door and the subsequently operative door with a time delay in the opening operation of the subsequently operative door following the opening operation of the initially operative door.

20 Claims, 6 Drawing Sheets

(56) References Cited

U.S. PATENT DOCUMENTS

| | | | | |
|---|---|---|---|---|
| 2023/0039719 | A1* | 2/2023 | Shingu | B60J 5/0468 |
| 2023/0349222 | A1* | 11/2023 | Miwa | B60R 25/20 |
| 2023/0391171 | A1* | 12/2023 | Gitter | B60J 5/062 |
| 2023/0399025 | A1* | 12/2023 | Rosenthal | B60R 3/02 |

* cited by examiner

VEHICLE SIDE-BY-SIDE DOORS OPENING AND CLOSING SYSTEM AND CONTROL METHOD THEREOF

CROSS-REFERENCE TO RELATED APPLICATIONS

This application claims the benefit of Korean Patent Application No. 10-2024-0026210, filed on Feb. 23, 2024, which application is hereby incorporated herein by reference.

TECHNICAL FIELD

The present disclosure relates to a vehicle side-by-side doors opening and closing system.

BACKGROUND

Generally, doors mounted on buses are categorized into any one of swing doors, sliding doors, and folding doors depending on their opening and closing methods.

For example, among the above-mentioned swing doors, externally openable side-by-side doors that open outward from the inside of the bus are provided so that the side-by-side doors, i.e. left and right doors, are opened toward a gate installed in a boarding/alighting structure such as a bus gate to provide convenience for passengers to board/alight without being exposed to the outside when the bus stops. In this case, the gate refers to the boarding/alighting door of the structure.

In particular, the externally openable side-by-side doors should be configured so that upon swinging of the doors, the left door and right door are opened/closed at symmetrical angles at the center position of the gate, ensuring the door opening and closing stability, and for this purpose, a vehicle needs to be stopped at the boarding/alighting structure so that the externally openable side-by-side doors are positioned at the center position of the gate.

Therefore, driverless autonomous vehicles or advanced cruise control (ACC)-adapted vehicles may use the externally openable side-by-side doors described above.

However, even if the side-by-side doors applied to the autonomous vehicles or ACC adapted vehicles are operated in a state of being centrally aligned with the gate of the boarding/alighting structure, the opening of the doors may be obstructed due to the difference between the door width and the gate width or external objects as obstacles placed around the gate.

As a result, the side-by-side doors may secure different path widths during the docking process between simultaneously openable right and left doors and the gate so that, in particular, overcurrent (i.e., stall current) may be generated when one of the left and right doors operated by an electric motor gets jammed to cause damage to the motor and lead to a reduction in motor life.

SUMMARY

The present disclosure relates to a vehicle side-by-side doors opening and closing system. Particular embodiments relate to a vehicle side-by-side doors opening and closing system in which a first initially operative door and a second subsequently operative door are operated with a delay, such that any door jamming occurring during the opening of the first door is reflected in the opening operation of the second door, protecting a motor of the second door from overcurrent, and a control method thereof.

Embodiments of the present disclosure provide a side-by-side doors opening and closing system for a vehicle, in which a first initially operative door and a second subsequently operative door are operated with a time delay, and an obstacle-door jamming that may occur during the progress of the opening of the first initially operative door or a structure wall-door jamming that may occur at the end of the opening of the first initially operative door, which is considered an estimated time of the second door-jamming, is prevented by reducing a door speed or drive current of the second subsequently operative door so that a motor damage caused by an overcurrent is prevented or a motor power consumption is reduced, and in particular, by alternating the operation order of the first initially operative door and the second subsequently operative door so that the damage to both motors for the first and second doors that are frequently operated is reduced, and a control method thereof.

In an embodiment of the present disclosure, a side-by-side doors opening and closing system for a vehicle includes a pair of side-by-side doors having a first door and a second door opening outwardly from a vehicle toward a boarding/alighting structure and a controller configured to assign the first door and the second door to an initially operative door and a subsequently operative door and to control a first door motor of the first door and a second door motor of the second door to perform opening operations of the initially operative door and the subsequently operative door with a time delay in the opening operation of the subsequently operative door following the opening operation of the initially operative door.

Preferably, the time delay may be set to a reference hall count of hall sensors installed on the first door motor and the second door motor, respectively.

Preferably, the controller may be configured to reduce the opening speed of the subsequently operative door at a detection point of the obstacle-door jamming occurring during the opening of the initially operative door or at a detection point of the structure wall-door jamming occurring at the end of the opening of the initially operative door, wherein the detection point of the obstacle-door jamming or the structure wall-door jamming is identified by an overcurrent relative to the drive current of current sensors installed on the first door motor and the second door motor, respectively.

Preferably, the controller may be configured to, upon no detection of the obstacle-door jamming of the subsequently operative door at the detection point of the obstacle-door jamming of the initially operative door, return the opening speed of the subsequently operative door to that before reducing the opening speed of the subsequently operative door up to the detection point of the structure wall-door jamming of the subsequently operative door.

Preferably, the controller may be configured to, upon no detection of the structure wall-door jamming of the subsequently operative door at the detection point of the structure wall-door jamming of the initially operative door, return the opening speed of the subsequently operative door to that before reducing the opening speed of the subsequently operative door up to the detection point of the structure wall-door jamming of the subsequently operative door.

Preferably, the controller may be configured to terminate the operation of the subsequently operative door upon the detection of the obstacle-door jamming of the subsequently operative door during the opening operation of the initially operative door and the subsequently operative door, and it may be configured to terminate the opening operation of the initially operative door at the detection point of the structure wall-door jamming.

Preferably, the controller may be configured to determine a central position of the boarding/alighting structure with a door sensor of the vehicle and supply a drive current to the first door motor and the second door motor with a docking command signal from a button or a mobile device.

Preferably, the controller may be configured to reverse the assignment to the initially operative door and the subsequently operative door for a second operation of the side-by-side doors following a first operation of the side-by-side doors.

In another embodiment of the present disclosure, a method of controlling, with a controller, a vehicle side-by-side doors opening and closing system upon the stop of an advanced cruise control (ACC) adapted vehicle includes operating a first door or a second door of side-by-side doors as a initially operative door, when an obstacle-door jamming of the initially operative door is detected during the opening of the initially operative door, reducing a door speed of a subsequently operative door from a reference speed, and, depending on whether an obstructive-door jamming of the subsequently operative door is detected during the opening of the subsequently operative door, terminating the operation of the subsequently operative door at the reduced door opening speed or at a returned set door opening speed.

Preferably, the controller may be configured to determine the positions of the side-by-side doors with a door sensor detecting a central position of the boarding/alighting structure and initiate the operation of the initially operative door by supplying a motor drive current with a docking command signal from a button or a mobile device.

Preferably, the controller may be configured to, after detecting an obstacle-door jamming of the initially operative door, reduce the opening speed of the subsequently operative door to a count value of a hall sensor on the side of the initially operative door and initiate the opening operation of the subsequently operative door at a detection point of the obstacle-door jamming after the end of the opening operation of the initially operative door.

Preferably, the controller may be configured to check whether an obstacle-door jamming of the subsequently operative door occurs after the hall count of the hall sensor on the side of the subsequently operative door during the opening operation of the subsequently operative door and, upon the detection of the obstacle-door jamming of the subsequently operative door, terminate the opening operation of the subsequently operative door immediately, or upon no detection of the obstacle-door jamming of the subsequently operative door, terminate the opening operation of the subsequently operative door after returning the reduced opening speed of the subsequently operative door to the reference speed up to the time to the detection of the structure wall-door jamming of the subsequently operative door at a maximum angle open state of the subsequently operative door.

Preferably, the controller may be configured to reverse the assignment to the initially operative door and the subsequently operative door for a second operation of the side-by-side doors following a first operation of the side-by-side doors.

In a further embodiment of the present disclosure, a method of controlling, with a controller, a vehicle side-by-side doors opening and closing system upon the stop of an advanced cruise control (ACC) adapted vehicle includes operating a first door or a second door of side-by-side doors as an initially operative door, when no obstacle-door jamming of the initially operative door is detected during the opening operation of the initially operative door, performing an opening operation of a subsequently operative door after a reference hall count of a hall sensor on the side of the initially operative door has elapsed, when the detected door jamming during the opening operations of the initially operative door and the subsequently operative door is caused by an obstacle-door jamming of the initially operative door, terminating the opening operation of the subsequently operative door at a reduced opening speed or a returned set opening speed of the subsequently operative door, and, when the detected door jamming during the opening operations of the initially operative door and the subsequently operative door is caused by the obstacle-door jamming of the subsequently operative door, terminating the opening operation of the initially operative door upon the detection of a structure wall-door jamming of the initially operative door after the termination of the opening operation of the subsequently operative door.

Preferably, the controller may be configured to determine the positions of the side-by-side doors with a door sensor detecting a central position of a boarding/alighting structure and initiate the operation of the initially operative door by supplying a motor drive current with a docking command signal from a button or a mobile device.

Preferably, the controller may be configured to, upon the detection of the obstacle-door jamming of the initially operative door, apply a door opening speed reduced to the hall count of the hall sensor on the side of the initially operative door to the subsequently operative door at the time of detecting the obstacle-door jamming after the end of the opening operation of the initially operative door, and perform the termination of the opening operation of the subsequently operative door through the detection of the obstacle-door jamming of the subsequently operative door after the hall count of the hall sensor on the side of subsequently operative door during the opening operation of the subsequently operative door such that, upon the detection of the obstacle-door jamming of the subsequently operative door, the termination of the opening operation of the subsequently operative door is immediately performed, or upon no detection of the obstacle-door jamming of the subsequently operative door, the termination of the opening operation of the subsequently operative door is performed after returning the reduced opening speed of the subsequently operative door to the reference speed up to the time to the detection of the structure wall-door jamming of the subsequently operative door.

Preferably, the controller may be configured to identify the detection of the structure wall-door jamming of the initially operative door as a maximum angle open state of the initially operative door and reverse the assignment to the initially operative door and the subsequently operative door for a second operation of the side-by-side doors following a first operation of the side-by-side doors.

According to the vehicle side-by-side doors opening and closing system and control method thereof, the difference in docking path due to the door width of the gate or the difference in door opening and closing angle due to the obstacle around the gate is solved by the staggered opening operation of the left and right doors, and in particular, the staggered opening operation alternately moves the left and right doors initially or subsequently, thereby reducing the damage to both motors for the left and right doors.

In addition, according to the vehicle side-by-side doors opening and closing system and control method thereof, upon the confirmation of the door jamming of the initially operative door by the staggered opening operation in scenario 1, overcurrent to the motor is avoided by lowering the driving speed of the subsequently operative door, or upon the expectation of the door jamming of the initially operative door by the staggered opening operation in scenario 2, the current values of both motors for the initially operative and subsequently operative doors are reduced, and such overcurrent avoidance and current reduction prevents damage to the motors for the initially operative and subsequently operative doors and reduction in the motor lifetime.

DETAILED DESCRIPTION OF ILLUSTRATIVE EMBODIMENTS

Embodiments of the present disclosure will now be described in detail with reference to the accompanying drawings, which embodiments are illustrative and not limited to the embodiments described herein, as the illustrated embodiments may be implemented in many different forms by one having ordinary skill in the art to which the present disclosure belongs.

Figure 1:
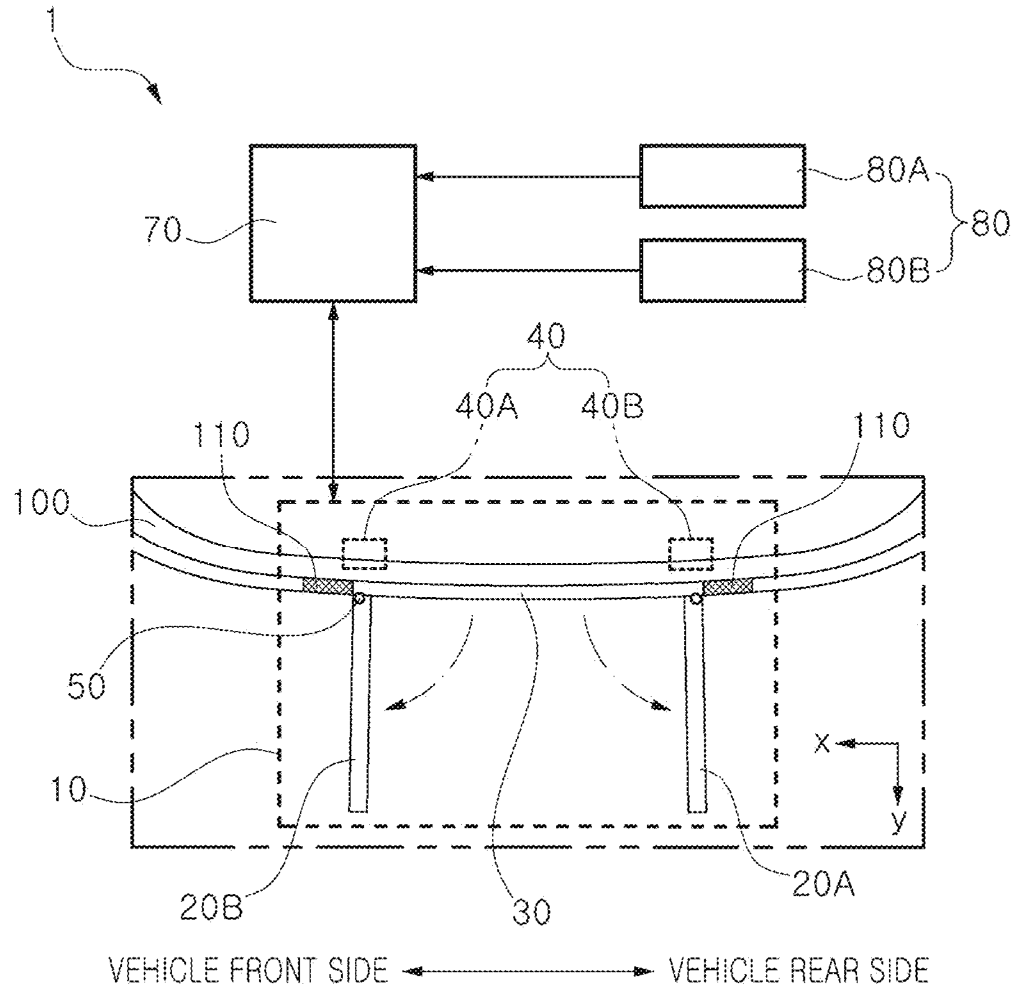
FIG. 1 is a block diagram illustrating a vehicle side-by-side doors opening and closing system according to an embodiment of the present disclosure.

Referring to FIG. 1, a side-by-side doors opening and closing system 1 includes side-by-side doors 10, which are an entrance to a vehicle 100, a controller 70, and a docking input device 80. In this case, the vehicle 100 includes driverless autonomous vehicles or advanced cruise control (ACC) adapted commercial vehicles such as passenger vehicles or buses.

Specifically, the side-by-side doors 10 include a first door 20A that is a right-hand door opening in an outward direction (y-axis of the xy-coordinate) from a right-hand side (x-axis of the xy-coordinate) of a gate 210 (see FIG. 3) installed on a boarding/alighting structure 200, such as a bus gate, and a second door 20B that is a left-hand door opening in an outward direction (y-axis of the xy-coordinate) from a left-hand side (x-axis of the xy-coordinate) of the gate, and a swing mechanism 30, a door motor 40, and a door sensor 50 for actuating the first and second doors 20A and 20B.

Thus, the side-by-side doors 10 are such that a maximum angle at which each of the first door 20A and the second door 20B may be opened is limited by opposite sides of the gate 210 installed on the boarding/alighting structure 200, and consequently each of the first and second doors 20A and 20B has the same maximum actuation angle.

In an example, the swing mechanism 30 includes a right swing mechanism and a left swing mechanism respectively connected to the first and second doors 20A and 20B to open the first door 20A to the right and the second door 20B to the left. In this case, the components and operation states of the swing mechanism 30 are the same as those of a swing mechanism applied to side-by-side doors of a conventional bus.

In an example, the door motor 40 includes a first door motor 40A for the right swing mechanism for opening the first door 20A to the right and a second door motor 40B for the left swing mechanism for opening the second door 20B to the left, and each of the first and second door motors 40A and 40B is equipped with a motor sensor 41 that detects a motor operation state while receiving an operation command in an electrical circuit formed with the controller 70. In this case, the installation position of the first and second door motors 40A and 40B is the same as that of two motors associated with the swing mechanism of side-by-side doors of a conventional bus.

For this purpose, the motor sensor 41 includes a current sensor 41*a* and a hall sensor 41*b*, wherein the current sensor 41*a* detects a drive current value for each of the first and second door motors 40A and 40B and transmits the current value to the controller 70, and the hall sensor 41*b* detects a number of revolutions for each of the first and second door motors 40A and 40B as a hall count and transmits the number of revolutions to the controller 70. In this case, the drive current value includes an overcurrent.

In an example, the door sensor 50 is installed at a door position of either of the first and second doors 20A and 20B of the side-by-side doors 10 of the vehicle 100, detects the position of the side-by-side doors 10 relative to the center of the boarding/alighting structure 200 when the vehicle 100 is parked/stopped at the gate 210 of the boarding/alighting structure 200 (see FIG. 3), and transmits the detected position to the controller 70.

Thus, the door sensor 50 enables the controller 70 to determine the center position of the side-by-side doors 10 and output a drive command.

For this purpose, the door sensor 50 may be any one of a radar sensor, a lidar sensor, and an ultrasonic sensor, and it may transmit the detected position signal to a vehicle controller of the vehicle 100.

Specifically, the controller 70 performs a scenario 1 in which the first and second doors 20A and 20B of the side-by-side doors 10 are operated with a time delay as an initially operative door and a subsequently operative door so that the motor overcurrent of the subsequently operative door according to the detection of a jamming of the initially operative door may be avoided, or a scenario 2 in which the current values of both the motors for the initially operative and subsequently operative doors according to the expectation of a jamming of the initially operative door may be reduced.

For this purpose, the controller 70 includes a memory, a central processor, a docking signal input, a door sensor input, a motor sensor input, and a door motor drive.

In an example, the memory stores the side-by-side doors opening and closing system control logic as a program, the central processor drives and controls the first and second door motors 40A and 40B with the sensor detection value while recognizing the control initiation by the docking signal, the docking signal input receives the docking signal from the docking input device 80, the door sensor input receives the detection value of the door sensor 50, the motor sensor input receives the detection value of the current sensor 41_a_ and the hall sensor 41_b_, and the door motor drive outputs driving commands to operate the first and second door motors 40A and 40B, respectively.

In particular, the controller 70 outputs the operation command of the door motor drive in a pulse width modulation (PWM) manner.

Specifically, the docking input device 80 delivers a docking command signal to the controller 70 so that the controller 70 may output driving commands to the first and second door motors 40A and 40B of the vehicle 100 located at the center of the boarding/alighting structure 200. In this case, the docking command signal may be transmitted via a signal line leading to the controller 70 or it may be transmitted as a radio frequency (RF) signal.

For this purpose, a button 80A or a mobile device 80B is used for the docking input device 80, wherein the button 80A is installed on the interior/exterior of the vehicle 100 or inside the boarding/alighting structure 200 to transmit the docking command signal to the controller 70, and the mobile device 80B may be a smartphone with an application that transmits the docking command signal to the controller 70.

Figure 2A:
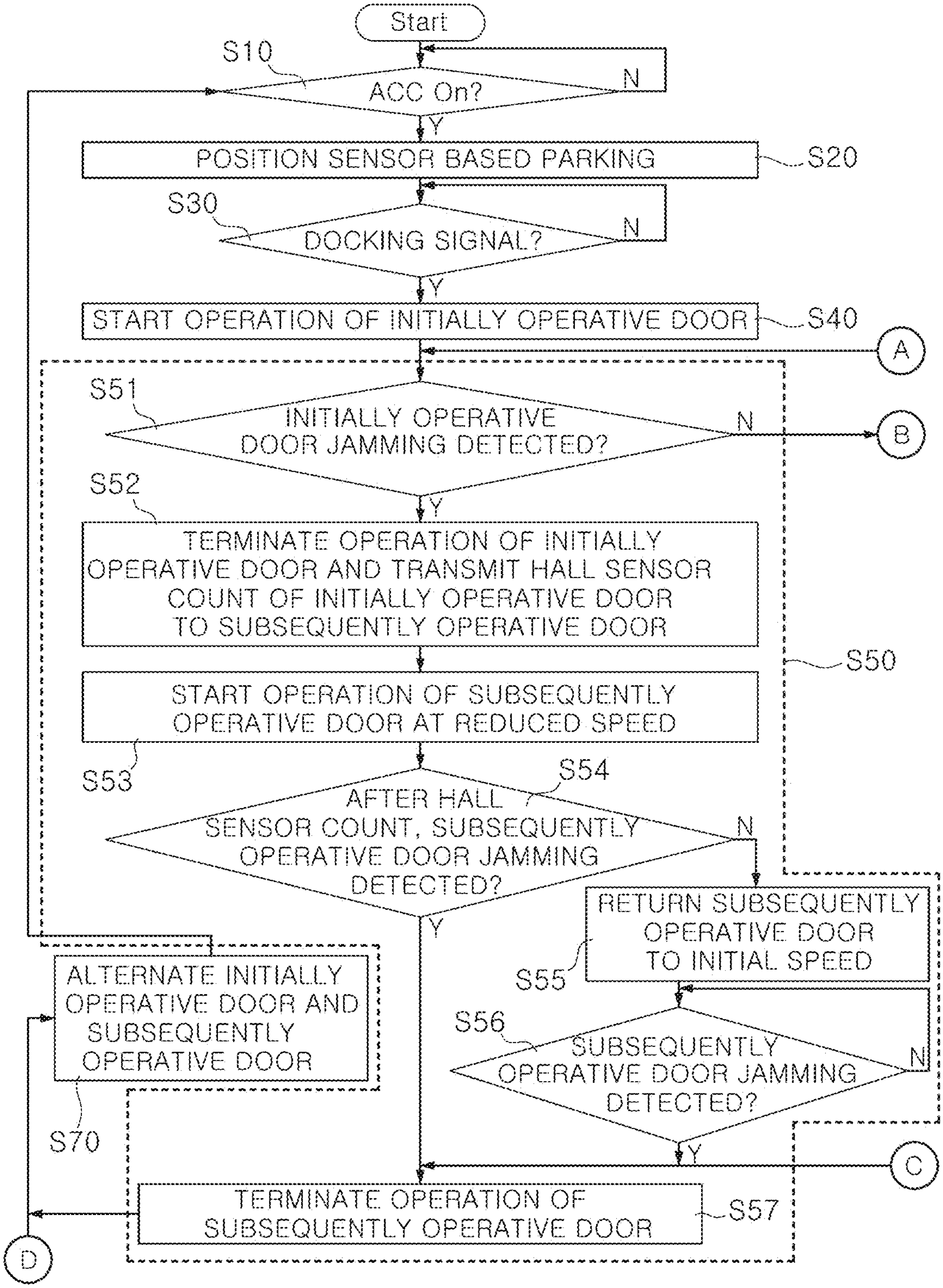
FIGS. 2A and 2B are flowcharts illustrating a method of controlling a vehicle side-by-side doors opening and closing system according to an embodiment of the present disclosure.
Figure 2B:
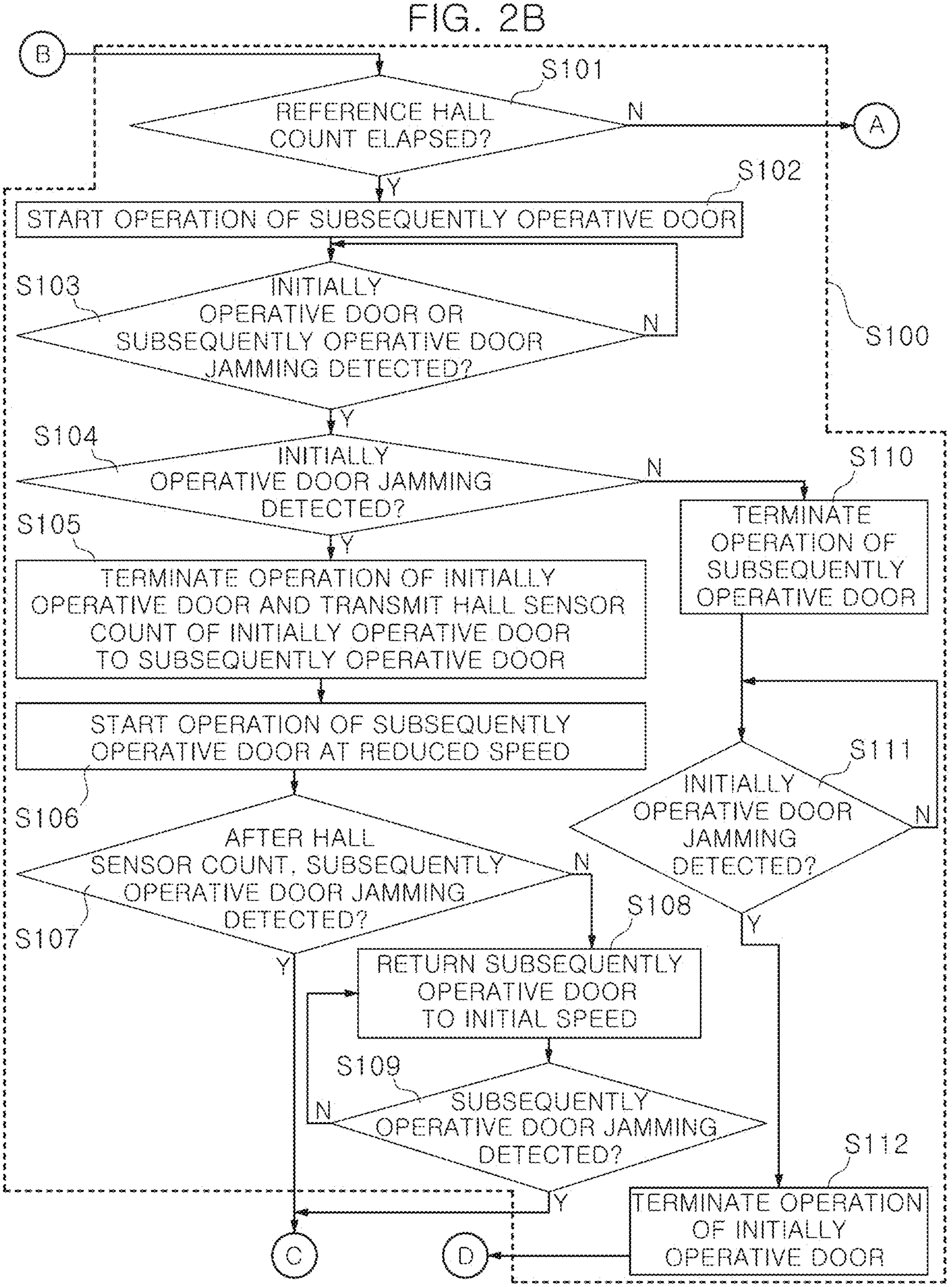

Meanwhile, FIGS. 2A and 2B are flowcharts illustrating a method of controlling a side-by-side doors opening and closing system of a vehicle 100, including opening an initially operative door upon the vehicle stop at S10 to S40, controlling a scenario 1-based staggered opening operation for a subsequently operative door at S50 or a scenario 2-based staggered opening operation for a subsequently operative door at S100, and alternately controlling the initially operative door and the subsequently operative door at S70.

Hereinafter, the control subject is the controller 70 and the control objects are the first and second door motors 40A and 40B of the side-by-side doors 10, and the control operation will be described with reference to FIGS. 3 to 5.

Furthermore, the first door 20A operates as an initially operative door, the second door 20B operates as a subsequently operative door, the staggered opening operation is an operation of the second door 20B that follows at a time interval after the operation of the first door 20A, and the jamming of the initially operative door or the jamming of the subsequently operative door means that the first and second doors 20A and 20B are prevented from opening to their maximum angles by contact with an external object, or the first and second doors 20A and 20B are opened to their maximum angles and in contact with a wall of the boarding/alighting structure 200 (or both doors of the gate 210).

Specifically, the opening operations S10 to S40 of the initially operative door upon the vehicle stop proceed through an ACC On stage at S10, a sensor-based vehicle stop stage at S20, a docking signaling stage at S30, and a stage S40 of operating the initially operative door at a set speed. In this case, the ACC refers to adaptive cruise control, where ACC On means that the vehicle 100 is autonomously driven without driver intervention, and the initially operative door set speed is a normal speed at which the first door 20A opens in an unimpeded state.

Figure 3:
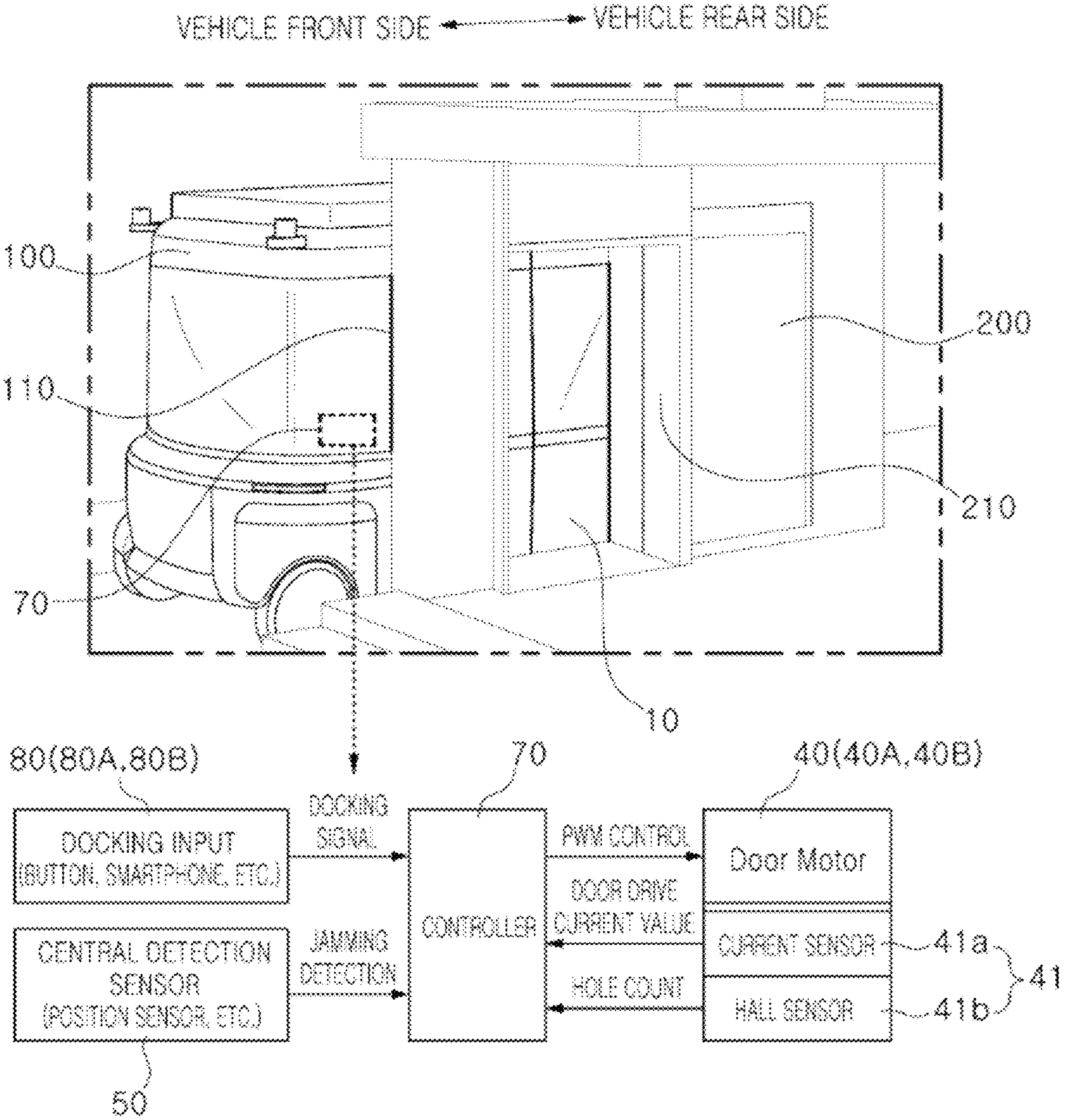
FIG. 3 is a diagram illustrating an operational state of a controller when a vehicle according to embodiments of the present disclosure is stopped at a boarding and alighting structure.

Referring to FIG. 3, the vehicle 100 applies side-by-side doors 10 in which the first and second doors 20A and 20B open to the right and left sides, respectively, and the controller 70 operates either of the first and second doors 20A and 20B as the initially operative door and then operates the other as the subsequently operative door in a staggered opening operation.

In an example, the ACC On stage S10 indicates that the vehicle 100 is autonomously driven without driver intervention with an advanced cruise control (ACC) function, and the sensor-based vehicle stop stage S20 indicates that the vehicle 100 is parked at a central position of the boarding/alighting structure 200 by providing the controller 70 (i.e., the door sensor input/central processor) with information about the central position of the boarding/alighting structure 200 provided by the door sensor 50 of the vehicle 100 approaching the boarding/alighting structure 200.

In particular, the vehicle 100 includes on the rim of the side-by-side doors 10 a gate sealant 110, which is in close contact with a rim section of the gate 210 at the central position of the boarding/alighting structure 200. In this case, the gate sealant 110 is made of a rubber material such as a weatherstrip.

In an example, the docking signal S30 is transmitted to the controller 70 (i.e., docking signal input/central processor) from a button 80A or a mobile device 80B that is a docking input device 80, and the stage S40 of operating the initially operative door at a set speed is performed by the controller 70 (i.e., central processor/door motor drive) receiving the docking signal and outputting the drive command to the first door motor 40A of the first and second door motors 40A and 40B to open the first door 20A of the first and second doors 20A and 20B.

As described above, the first door 20A of the first and second doors 20A and 20B of the side-by-side doors 10 is operated as the initially operative door while the vehicle 100 is parked at the gate 210 of the boarding/alighting structure 200 so that upon the vehicle stop, the opening of the initially operative door is performed at S10 to S40.

Then, the operation S50 of controlling the scenario 1-based staggered opening operation for the subsequently operative door is implemented in the opening operation of the subsequently operative door with a time difference of the delay time (t) during the opening operation of the initially operative door, which is performed by the stage S51 of detecting the jamming of the initially operative door, the stages S52 to S54 of controlling the variable operation of the subsequently operative door, the stages S55 to S56 of controlling the setting operation of the subsequently operative door, and the stage S57 of terminating the operation of the initially operative door.

Referring to FIG. 3, the controller 70 (i.e., the motor sensor input/central processor) checks the normal current and the overcurrent from the current detection value input from the current sensor 41_a_ of the motor sensor 41 and checks the motor speed from the hall count value input from the hall sensor 41_b_.

Figure 4:
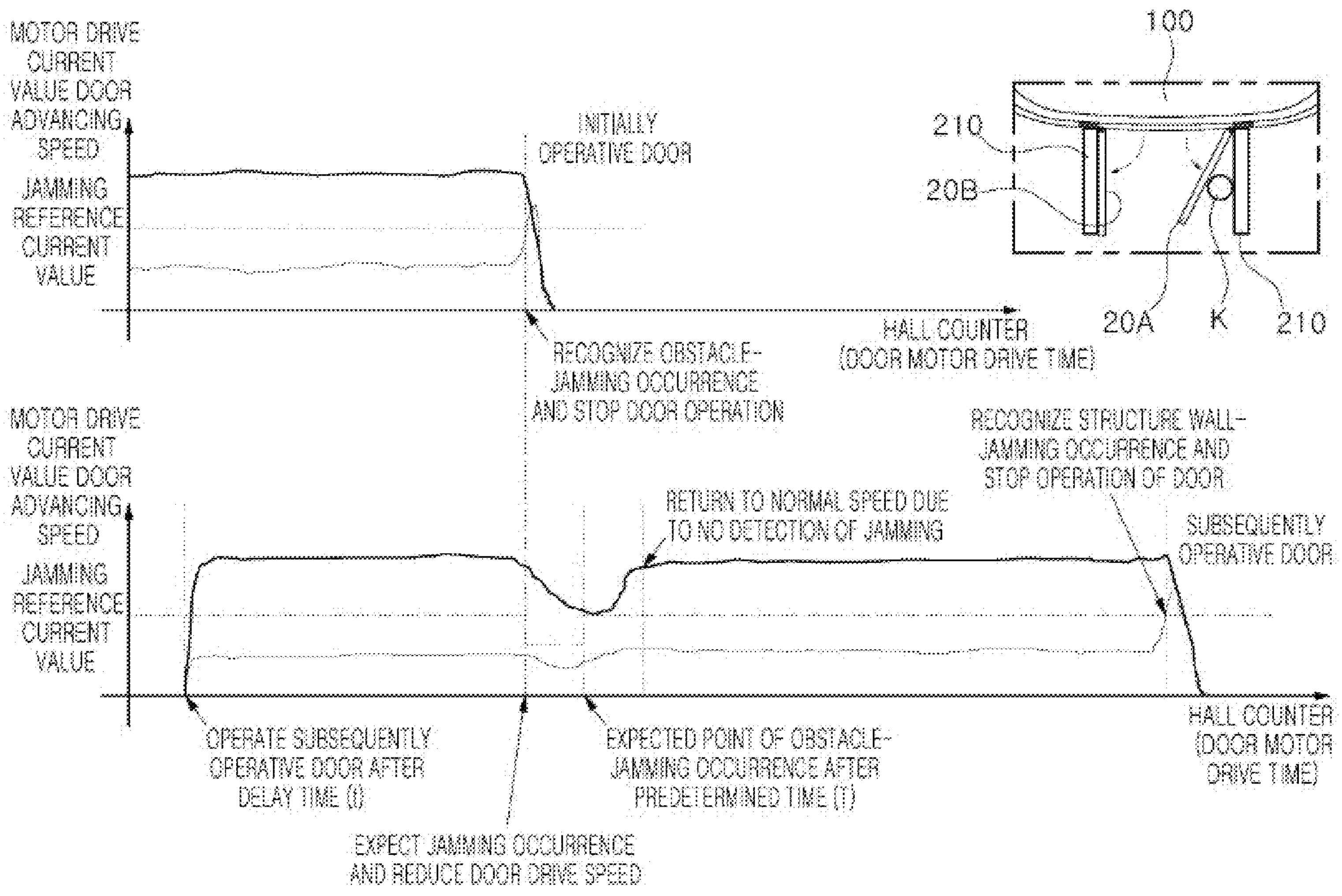
FIG. 4 is a diagram illustrating an opening operation of first and second doors of the side-by-side doors opening and closing system in a staggered opening operation of scenario 1 according to embodiments of the present disclosure.

Referring to FIG. 4, the detection S51 Y of the initially operative door jamming is exemplified in a line diagram of the motor drive current value vs motor drive time. In this case, the motor drive time is calculated by the hall count of the hall sensor 41_b_ of the first and second door motors 40A and 40B.

As illustrated, the scenario 1-based staggered operation control S50 for the subsequently operative door is performed such that when, in the first and second doors 20A and 20B docked with the boarding/alighting structure 200, the first door 20A (i.e., the initially operative door) is opened first and the second door 20B (i.e., the subsequently operative door) is opened subsequently with a time difference of a delay time t, upon the detection of an overcurrent of the current sensor 41_a_ due to contact with an obstacle K during the opening operation of the first door 20A (i.e., the initially operative door), it is recognized that an obstacle-door jamming has occurred so that the first door 20A (i.e., the initially operative door) is stopped, and assuming that the time of the obstacle-door jamming occurrence due to the stopping of the first door 20A (i.e., the initially operative door) as the expected time of the obstacle-door jamming occurrence, the second door 20B (i.e., the subsequently operative door) reduces the door drive speed from that of the first door 20A (i.e., the initially operative door) after a predetermined time T.

This enables the second door 20B (i.e., the subsequently operative door) to avoid the overcurrent experienced by the first door 20A (i.e., the initially operative door) at the time of the obstacle-door jamming of the first door 20A (i.e., the initially operative door) during the opening operation, to return the door drive speed to the normal speed during the opening operation after the obstacle-door jamming time, and to stop and open completely at the time of the structure wall-door jamming.

In an example, the obstacle initially operative door jamming detection S51 is recognized as an obstacle-door jamming occurrence when an overcurrent is confirmed from the monitoring of the drive current of the current sensor 41*a* for the drive current value of the first door motor 40A.

Therefore, the controller 70 (i.e., the central processor) continues to control the opening S50 of the subsequently operative door in a scenario 1-based staggered operation at the detection Y of the obstacle initially operative door jamming, while switching to the stage S101 of checking the progress of the reference hall count at no detection N of the obstacle initially operative door jamming. In this case, the initially operative door jamming detection Y indicates that the first door 20A of the initially operative door is prevented from opening due to contact with the obstacle K, and therefore may not open to the maximum angle.

Specifically, the subsequently operative door variable operation control S52 to S54 is a subsequently operative door opening speed deceleration during the opening of the subsequently operative door with a time difference of the delay time t from the initially operative door, which is realized as a stage S52 of reflecting the hall count of the initially operative door motor to the subsequently operative door, a stage S53 of decelerating the subsequently operative door opening speed, and a stage S54 of detecting the expected jamming after the hall count of the subsequently operative door motor.

In an example, the stage S52 of reflecting the hall count of the initially operative door motor to the subsequently operative door checks the number of revolutions (i.e., speed) of the first door motor 40A of the initially operative door with the value of the hall count of the hall sensor 41*b* for the initially operative door after the termination of the operation due to jamming of the initially operative door and determines the value of the drive current at which the opening speed of the subsequently operative door is reduced from that of the initially operative door on the basis of the hall count of the initially operative door. In this case, the initially operative door hall count is the hall count value of the hall sensor 41*b* on the side of the initially operative door at the time of the obstacle-door jamming detection S51.

Then, the subsequently operative door opening speed reduction S53 causes the subsequently operative door to start operating at a reduced speed due to reduction in the current and torque of the second door motor 40B receiving a PWM drive command with a reduced drive current value compared to the set value.

Then, in the jamming expectation detection S54 after the hall count of the subsequently operative door motor, a predetermined hall count calculation value expecting the obstacle-door jamming of the subsequently operative door at the time of the obstacle-door jamming of the initially operative door is set to a predetermined time T. In this case, the predetermined time T is determined as the hall count value monitored by the hall sensor 41*b* during the opening operation of the subsequently operative door.

As a result, in the case of detection Y of a jamming of the subsequently operative door at the elapsed time T, the obstacle-door jamming of the subsequently operative door occurs like the initially operative door, so the stage switches to the stage S60 of terminating the operation control of the subsequently operative door so that the second door motor 40B is stopped, whereas in the case of no detection N of the jamming of the subsequently operative door at the elapsed time T, the subsequently operative door moves past the time at which the obstacle-door jamming of the initially operative door occurs, so the stage switches to the stage S55 of returning to the set speed of the subsequently operative door.

Specifically, the stages S55 to S56 of controlling the setting of the operation of the subsequently operative door lead to the stage S55 of returning to the set speed of the subsequently operative door and the stage S56 of detecting the jamming of the subsequently operative door.

In an example, since the stage S55 of returning to the set speed of the subsequently operative door is a stage of returning to a reference speed that is the normal speed (i.e., the set speed of the subsequently operative door) at which the second door 20B opens in an unimpeded state, the drive current value of the second door motor 40B is the same as that of the first door motor 40A prior to the jamming of the initially operative door.

Furthermore, the detection S56 of the jamming of the subsequently operative door indicates a structure wall-door jamming in which the second door 20B, which is the subsequently operative door, is in contact with a wall of the boarding/alighting structure 200 (or both doors of the gate 210), being opened at a maximum angle.

In an example, the stage S57 of terminating the operation of the initially operative door indicates an obstacle-door jamming S54 Y or a structure wall-door jamming S56 Y of the subsequently operative door, so that while the initially operative door is stopped during the opening operation, the subsequently operative door is stopped midway through opening or is opened at the maximum angle into a structure wall-door jamming state.

As described above, in the scenario 1-based staggered operation control S50 for the subsequently operative door, even if there is a door jamming occurring during the opening of either of the first and second doors 20A and 20B in the operation of the side-by-side doors 10, the other door opening operation may be performed without motor damage due to an overcurrent.

On the other hand, the operation S100 of the scenario 2-based staggered operation control for the subsequently operative door is implemented in the opening operation of the subsequently operative door with a time difference of a delay time t during the opening operation of the initially operative door with no detection of a jamming of the initially operative door S51 N. This is performed by a stage S101 of checking an elapse of a reference hall count, stages S102 to S104 of detecting the initially operative door jamming after the subsequently operative door operation, stages S105 to S107 of controlling a variable operation of the subsequently operative door, stages S108 to S109 of controlling a set operation of the subsequently operative door, and stages S110 to S112 of continuously controlling an operation of the initially operative door.

Figure 5:
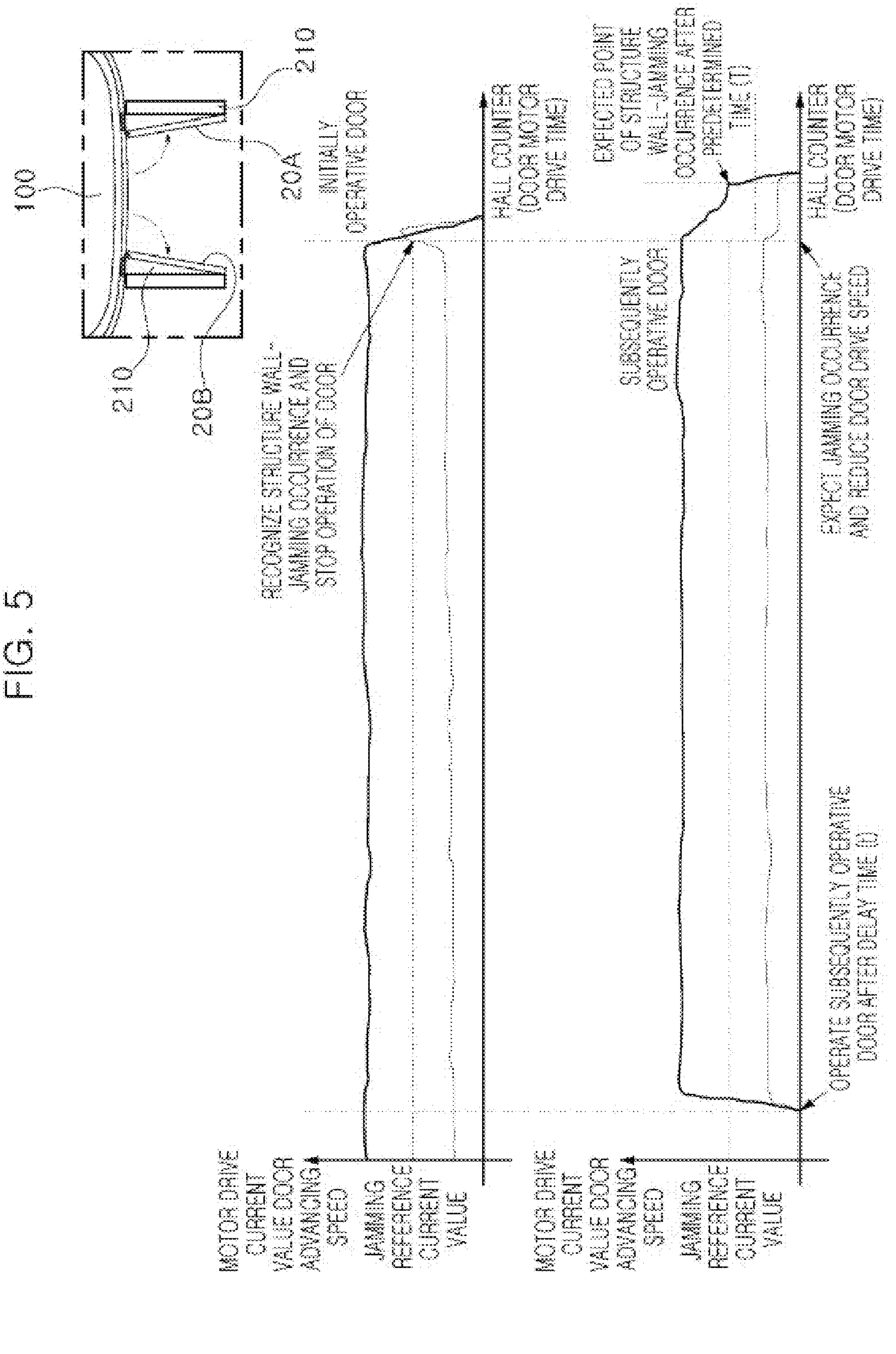
FIG. 5 is a diagram illustrating an opening operation of first and second doors of the side-by-side doors opening and closing system in a staggered opening operation of scenario 2 according to embodiments of the present disclosure.

Referring to FIG. 5, the state of the initially operative door jamming detection S104 Y and the state of the subsequently operative door jamming detection S104 N are exemplified as a line diagram of the motor drive current value-motor drive time. In this case, the motor drive time is calculated by a hall count by the hall sensor 41*b* of the first and second door motors 40A and 40B.

As illustrated, the scenario 2-based staggered operation control S100 for the subsequently operative door is performed such that when, in the first and second doors 20A and 20B docked with the boarding/alighting structure 200, the first door 20A (i.e., the initially operative door) is opened first and the second door 20B (i.e., the subsequently operative door) is opened subsequently with a time difference of a delay time t, the state in which the first door 20A (i.e., the initially operative door) proceeds unimpeded by the obstacle K and hits the wall of the gate 210 and is fully opened and stopped is recognized that a structure wall-door jamming has occurred, and assuming that the time of the structure wall-door jamming occurrence causing the stopping of the first door 20A (i.e., the initially operative door) motor as the expected time of the structure wall-door jamming occurrence (i.e., for the second door 20B), the second door 20B (i.e., the subsequently operative door) reduces the door drive speed from that of the first door 20A (i.e., the initially operative door) after a predetermined time T.

This enables the second door 20B (i.e., the subsequently operative door) to consume a relatively small amount of power because the value of the drive current of the second door motor 40B is small when the second door 20B (i.e., the subsequently operative door) hits the wall of the gate 210 and is fully opened and stopped, thereby prolonging the lifetime of the motor while also consuming a small amount of power because the value of the overcurrent that causes damage to the motor is small even if the second door hits the wall.

In an example, the checking S101 of an elapse of the above reference hall count uses the delay time t between the initially operative door and the subsequently operative door with the reference hall count, so that if the hall count value of the hall sensor 41*b* has not elapsed the reference hall count, the process returns to the initially operative door opening operation stage S51 and stands by, and if the hall count value has not elapsed the reference hall count, the process proceeds to the subsequently operative door operation stage S102.

Specifically, the jamming detection stages S102 to S104 of the initially operative door after the operation of the subsequently operative door are an operation state in which the subsequently operative door is opened with a time difference of a delay time t from the initially operative door, which is performed by the subsequently operative door operation stage S102, the door jamming occurrence detection stage S103, and the initially operative door jamming detection stage S104.

In an example, the subsequently operative door operation S102 is a state in which the subsequently operative door is opened at a motor drive speed set with a time difference of a delay time t from the initially operative door, and the door jamming detection S103 is a state in which an overcurrent is generated in the current sensor 41*a* of the first door motor 40A or the second door motor 40B while the initially operative door and the subsequently operative door are opened together, so that the initially operative door or the subsequently operative door is detected as being in a door jamming state.

In an example, the initially operative door jamming detection S104 is a structure wall-door jamming occurrence state in which the initially operative door advances without obstruction from the obstacle K and hits the wall of the gate 210 and is fully opened and stopped, and in the case of the detection Y of the initially operative door jamming, the subsequently operative door is reflected with the hall count of the initially operative door motor in S105, while in the case of no detection N of the initially operative door jamming, the subsequently operative door is in an obstacle-door jamming of the subsequently operative door, and the stage is switched to the stage S110 of terminating the operation of the subsequently operative door.

Therefore, the subsequently operative door variable operation control S105 to S107 is a subsequently operative door opening speed deceleration for the subsequently operative door in a state in which the initially operative door is fully opened and the motor is stopped, which is implemented as a stage S105 of reflecting the hall count of the initially operative door motor to the subsequently operative door, a stage S106 of decelerating the subsequently operative door opening speed, and a stage S107 of detecting the expected jamming after the hall count of the subsequently operative door motor.

In an example, the reflection S105 of the hall count of the initially operative door motor to the subsequently operative door confirms the number of revolutions (i.e., speed) of the first door motor 40A after the driving stop of the first door motor 40A at the time of the structure wall-door jamming of the initially operative door with the hall count value of the hall sensor 41*b* and determines a drive current value at which the opening speed of the subsequently operative door is reduced from the speed at the time of the operation of the subsequently operative door on the basis of the hall count.

Then, the subsequently operative door opening speed deceleration S106 is PWM output such that the drive current value for the second door motor 40B is reduced from the set value at the time of the structure wall-door jamming occurrence of the initially operative door, so that the subsequently operative door starts to operate at a reduced speed compared to the initial speed.

Then, the jamming expectation detection S107 after the hall count of the subsequently operative door motor considers the time difference of the delay time t from the time of the structure wall-door jamming occurrence causing the motor stopping of the initially operative door with a predetermined time T by the hall count value and detects the occurrence of the obstacle-door jamming of the subsequently operative door before reaching the predetermined time T. In this case, the predetermined time T is determined by the hall count value monitored by the hall sensor 41*b* during the opening operation of the subsequently operative door.

Therefore, in the case of the obstacle-door jamming detection S107 Y of the subsequently operative door, the stage enters the subsequently operative door operation control termination S47.

Then, the subsequently operative door setting operation control S108 to S109 continues to a stage S108 of returning to a set speed of the subsequently operative door and a stage S109 of detecting the subsequently operative door jamming.

In an example, the stage S108 of returning to the set speed of the subsequently operative door refers to the stage in which the occurrence of the structure wall-door jamming of the subsequently operative door is not detected up to the predetermined time T even though the subsequently operative door has reduced the speed at the time of the occurrence of the structure wall-door jamming causing the motor stopping of the initially operative door. This means a return to the reference speed, which is the speed before reducing the door operation speed of the subsequently operative door, so the drive current value of the subsequently operative door also returns to the previous current value that is not reduced.

In addition, the subsequently operative door jamming detection S109 refers to a structure wall-door jamming occurrence state of the subsequently operative door in which as in the initially operative door, the subsequently operative door is also opened at a maximum angle to contact the wall of the boarding/alighting structure 200 (or both doors of the gate 210), which means that the drive current value of the second door motor 40B is small until the subsequently operative door hits the wall of the gate 210 at the time of the structure wall-door jamming and is fully opened and stopped, so that less power is consumed compared to the stopping of the initially operative door.

Therefore, in the case of the structure wall-door jamming detection S109 Y of the subsequently operative door, the stage enters the stage S57 of terminating the operation control of the subsequently operative door.

As described above, the scenario 2-based staggered operation control S100 for the subsequently operative door also enters the initially operative door operation termination S57 in the case of the obstacle-door jamming S107 Y or structure wall-door jamming S109 Y of the subsequently operative door, and the initially operative door operation termination S57 is such that the subsequently operative door is stopped during the opening operation or is opened to the maximum angle in the structure wall-door jamming state while the initially operative door is opened to the maximum angle.

Therefore, the scenario 2-based staggered operation control S100 for the subsequently operative door reduces the drive current value of the second door motor 40B before the subsequently operative door is fully opened and stopped so that the overcurrent value causing the motor to be damaged upon the structure wall-door jamming is reduced, thereby prolonging the motor lifetime and consuming relatively less power, which differs from the scenario 1-based staggered operation control S50 for the subsequently operative door in that the latter focuses on protecting the first and second door motors 40A and 40B from an overcurrent.

In addition, the initially operative door operation continuation control S110 to S112 is performed by a subsequently operative door operation termination stage S110, an initially operative door jamming detection stage S111, and an initially operative door operation termination stage S112.

In an example, the subsequently operative door operation termination S110 refers to a state in which an obstacle subsequently operative door jamming occurs due to an obstacle K (see FIG. 4) at the door jamming occurrence detection S103, which terminates the opening operation of the subsequently operative door by stopping the drive of the motor.

In an example, the initially operative door jamming detection S111 refers to a state in which the occurrence of a structure wall-door jamming for the initially operative door is detected in view of the fact that the initially operative door is opening while the subsequently operative door is stopped.

In an example, the preceding door operation termination S112 refers to the structure wall-door jamming detection S111 Y of the initially operative door, so that the initially operative door is opened to the maximum angle in the structure wall-door jamming state while the subsequently operative door is stopped during opening.

Therefore, the initially operative door operation termination S112 enters the alternate control S70 of the initially operative door and subsequently operative door.

Meanwhile, the alternate control S70 of the initially operative door and subsequently operative door is performed such that the use of the first door 20A of the first and second doors 20A and 20B as an initially operative door in the opening cycle of the side-by-side doors 10 terminated with the subsequently operative door operation termination S57 and the initially operative door operation termination S112 is stored in the memory of the controller 70 as the first door bit 0 (Bit=0), and then when the opening cycle of the side-by-side doors 10 is performed again, if the first door bit is 0, the second door bit 1 (Bit=1) is set to cause the second door 20B of the first and second doors 20A and 20B to operate as an initially operative door. In this case, the second door bit 1 (Bit=1) replaces the first door bit 0 (Bit=0), which is the previous memory storage value of the controller 70.

This enables the first and second doors 20A and 20B of the side-by-side doors 10 to share motor damage to the first and second door motors 40A and 40B by alternating the initially operative door operation via the first door bit 0 (Bit=0) and the second door bit 1 (Bit=1).

As described above, in the vehicle side-by-side doors opening and closing system and control method thereof according to the present embodiment, when the controller 70, having determined that the side-by-side doors 10 of the vehicle 100 are centered in the boarding/alighting structure 200, operates the first door 20A as the initially operative door and the second door 20B as the subsequently operative door with a delay time t, assuming the obstacle-door jamming caused by the obstacle K during the opening operation of the initially operative door as the expected time of the obstacle-door jamming of the subsequently operative door, the door speed of the subsequently operative door is reduced to prevent motor damage due to overcurrent, and assuming the structure wall-door jamming caused by the boarding/alighting structure 200 at the completion of the opening of the initially operative door as the expected time of the structure wall-door jamming of the subsequently operative door, the motor power consumption may be reduced by reducing the drive current of the subsequently operative door, thereby reducing the motor power consumption while protecting the second door motor 40B of the second door 20B operated as the subsequently operative door from an overcurrent.

What is claimed is:

1. A vehicle side-by-side doors opening and closing system, the system comprising:

a pair of side-by-side doors having a first door and a second door configured to open outwardly from a vehicle toward a boarding and alighting structure; and a controller configured to assign the first door and the second door to an initially operative door and a subsequently operative door and to control a first door motor of the first door and a second door motor of the second door to perform opening operations of the initially operative door and the subsequently operative door with a time delay in the opening operation of the subsequently operative door following the opening operation of the initially operative door, wherein the time delay is set to a reference hall count of hall sensors disposed on the first door motor and the second door motor, respectively.

2. The system of claim 1, wherein the controller is configured to reduce an opening speed of the subsequently operative door at a detection point of an obstacle-door jamming occurring during the opening of the initially operative door or at a detection point of a structure wall-door jamming occurring at an end of the opening of the initially operative door.

3. The system of claim 2, wherein the detection point of the obstacle-door jamming or the structure wall-door jamming is identified by an overcurrent relative to a drive current of current sensors disposed on the first door motor and the second door motor, respectively.

4. The system of claim 2, wherein the controller is configured to, upon no detection of the obstacle-door jamming of the subsequently operative door at the detection point of the obstacle-door jamming of the initially operative door, return the opening speed of the subsequently operative door to that before reducing the opening speed of the subsequently operative door up to the detection point of the structure wall-door jamming of the subsequently operative door.

5. The system of claim 2, wherein the controller is configured to, upon no detection of the structure wall-door jamming of the subsequently operative door at the detection point of the structure wall-door jamming of the initially operative door, return the opening speed of the subsequently operative door to that before reducing the opening speed of the subsequently operative door up to the detection point of the structure wall-door jamming of the subsequently operative door.

6. The system of claim 2, wherein the controller is configured to:

terminate the opening operation of the subsequently operative door upon detection of the obstacle-door jamming of the subsequently operative door during the opening operations of the initially operative door and the subsequently operative door; and terminate the opening operation of the initially operative door at the detection point of the structure wall-door jamming.

7. The system of claim 1, wherein the controller is configured to determine a central position of the boarding and alighting structure with a door sensor of the vehicle.

8. The system of claim 1, wherein the controller is configured to supply a drive current to the first door motor and the second door motor with a docking command signal from a button or a mobile device.

9. The system of claim 1, wherein the controller is configured to reverse the assignment of the first door and the second door to the initially operative door and the subsequently operative door for a second operation of the side-by-side doors following a first operation of the side-by-side doors.

10. The system of claim 1, wherein the controller is configured to reduce an opening speed of the subsequently operative door at a detection point of an obstacle-door jamming occurring during the opening of the initially operative door.

11. A method of controlling, with a controller, a vehicle side-by-side doors opening and closing system upon the stop of an advanced cruise control adapted vehicle, the method comprising:

operating a first door or a second door of side-by-side doors as an initially operative door;

in response to detection of an obstacle-door jamming of the initially operative door during opening of the initially operative door, reducing a door opening speed of a subsequently operative door of the side-by-side doors from a reference speed; and depending on whether an obstructive-door jamming of the subsequently operative door is detected during opening of the subsequently operative door, terminating operation of the subsequently operative door at the reduced door opening speed or at a returned set door opening speed.

12. The method of claim 11, further comprising:

determining, by the controller, positions of the side-by-side doors with a door sensor detecting a central position of a boarding/alighting structure; and initiating the opening of the initially operative door by supplying a motor drive current with a docking command signal from a button or a mobile device.

13. The method of claim 11, further comprising:

after detecting an obstacle-door jamming of the initially operative door, reducing the opening speed of the subsequently operative door to a count value of a hall sensor on a side of the initially operative door; and initiating the opening of the subsequently operative door at a detection point of the obstacle-door jamming after the end of the opening of the initially operative door.

14. The method of claim 13, further comprising:

checking whether the obstacle-door jamming of the subsequently operative door occurs after the hall count of the hall sensor on a side of the subsequently operative door during the opening of the subsequently operative door; and upon detection of the obstacle-door jamming of the subsequently operative door, terminating the opening of the subsequently operative door immediately; or upon no detection of the obstacle-door jamming of the subsequently operative door, terminating the opening of the subsequently operative door after returning the reduced opening speed of the subsequently operative door to the reference speed up to the time of detection of a structure wall-door jamming of the subsequently operative door at a maximum angle open state of the subsequently operative door.

15. The method of claim 13, further comprising reversing an assignment of the first door and the second door to the initially operative door and the subsequently operative door for a second operation of the side-by-side doors following a first operation of the side-by-side doors.

16. A method of controlling, with a controller, a vehicle side-by-side doors opening and closing system upon the stop of an advanced cruise control adapted vehicle, the method comprising:

operating a first door or a second door of side-by-side doors as an initially operative door;

in response to no obstacle-door jamming of the initially operative door being detected during an opening operation of the initially operative door, performing an opening operation of a subsequently operative door after a reference hall count of a hall sensor on a side of the initially operative door has elapsed;

in response to detecting door jamming during the opening operations of the initially operative door and the subsequently operative door being caused by an obstacle-door jamming of the initially operative door, terminating the opening operation of the subsequently operative door at a reduced opening speed or a returned set opening speed of the subsequently operative door; and in response to the detected door jamming during the opening operations of the initially operative door and the subsequently operative door being caused by the obstacle-door jamming of the subsequently operative door, terminating the opening operation of the initially operative door upon detection of a structure wall-door jamming of the initially operative door after the termination of the opening operation of the subsequently operative door.

17. The method of claim 16, further comprising determining positions of the side-by-side doors with a door sensor detecting a central position of a boarding/alighting structure and initiating the opening operation of the initially operative door by supplying a motor drive current with a docking command signal from a button or a mobile device.

18. The method of claim 16, further comprising:

upon the detection of the obstacle-door jamming of the initially operative door, applying a door opening speed reduced to a hall count of the hall sensor on the side of the initially operative door to the subsequently operative door at a time of detecting the obstacle-door jamming after an end of the opening operation of the initially operative door; and performing the termination of the opening operation of the subsequently operative door through the detection of the obstacle-door jamming of the subsequently operative door after the hall count of the hall sensor on a side of the subsequently operative door during the opening operation of the subsequently operative door such that, upon the detection of the obstacle-door jamming of the subsequently operative door, the termination of the opening operation of the subsequently operative door is terminated immediately, or upon no detection of the obstacle-door jamming of the subsequently operative door, the termination of the opening operation of the subsequently operative door is performed after returning the reduced opening speed of the subsequently operative door to the reference speed up to the time of the detection of the structure wall-door jamming of the subsequently operative door.

19. The method of claim 16, further comprising identifying the detection of the structure wall-door jamming of the initially operative door as a maximum angle open state of the initially operative door.

20. The method of claim 16, further comprising reversing an assignment of the first door and the second door to the initially operative door and the subsequently operative door for a second operation of the side-by-side doors following a first operation of the side-by-side doors.

* * * * *